United States Patent
Pirker et al.

(10) Patent No.: US 11,454,947 B2
(45) Date of Patent: Sep. 27, 2022

(54) METHOD AND APPARATUS FOR OPTIMIZING DYNAMICALLY INDUSTRIAL PRODUCTION PROCESSES

(71) Applicant: Siemens Aktiengesellschaft, Munich (DE)

(72) Inventors: Michael Pirker, Lenggries (DE); Jan-Gregor Fischer, Zorneding (DE)

(73) Assignee: SIEMES AKTIENGESELLSCHAFT, Munich (DE)

(*) Notice: Subject to any disclaimer, the term of this patent is extended or adjusted under 35 U.S.C. 154(b) by 116 days.

(21) Appl. No.: 16/960,116

(22) PCT Filed: Jan. 14, 2019

(86) PCT No.: PCT/EP2019/050761
§ 371 (c)(1),
(2) Date: Jul. 6, 2020

(87) PCT Pub. No.: WO2019/141615
PCT Pub. Date: Jul. 25, 2019

(65) Prior Publication Data
US 2021/0063996 A1    Mar. 4, 2021

(30) Foreign Application Priority Data

Jan. 19, 2018 (EP) .................... 18152503

(51) Int. Cl.
*G05B 19/406* (2006.01)
*G05B 19/4155* (2006.01)
(Continued)

(52) U.S. Cl.
CPC ....... *G05B 19/406* (2013.01); *G05B 19/4155* (2013.01); *G06Q 10/0633* (2013.01);
(Continued)

(58) Field of Classification Search
CPC ........... G06Q 10/00–50/00; G05B 1/00–24/00
(Continued)

(56) References Cited

U.S. PATENT DOCUMENTS

| | | | | |
|---|---|---|---|---|
| 5,229,948 A | * | 7/1993 | Wei ........................ | G06Q 10/06 703/2 |
| 6,721,609 B1 | * | 4/2004 | Wojsznis ............. | G05B 13/048 700/55 |

(Continued)

FOREIGN PATENT DOCUMENTS

EP          2801937 A1     11/2014

OTHER PUBLICATIONS

Antzoutatos Nicolas et al: "A Multi-Agent System Architecture for Self-configuration", Precision Assembly Technologiesand Systems, pp. 118-125, XP055489166, DOI: 10.1007/978-3-; Retrieved from the Internet: URL:https://hal.inria.fr/hal-01260745/document: [retrieved on Jun. 29, 2018] the whole document; 2014.

(Continued)

*Primary Examiner* — Alan S Miller
(74) *Attorney, Agent, or Firm* — Schmeiser, Olsen & Watts LLP

(57) ABSTRACT

Provided is a process optimizer apparatus for optimizing dynamically an industrial production process of a production plant including physical production modules, the process optimizer including a watchdog component adapted to monitor the production modules of the production plant to detect configuration changes within the production plant; a model comparator component adapted to evaluate a production plant data model of the production plant including digital twin data models related to physical production modules of the production plant to identify automatically deviating model elements of digital twin data models related to physical production modules of the production plant (Continued)

Figure 1:
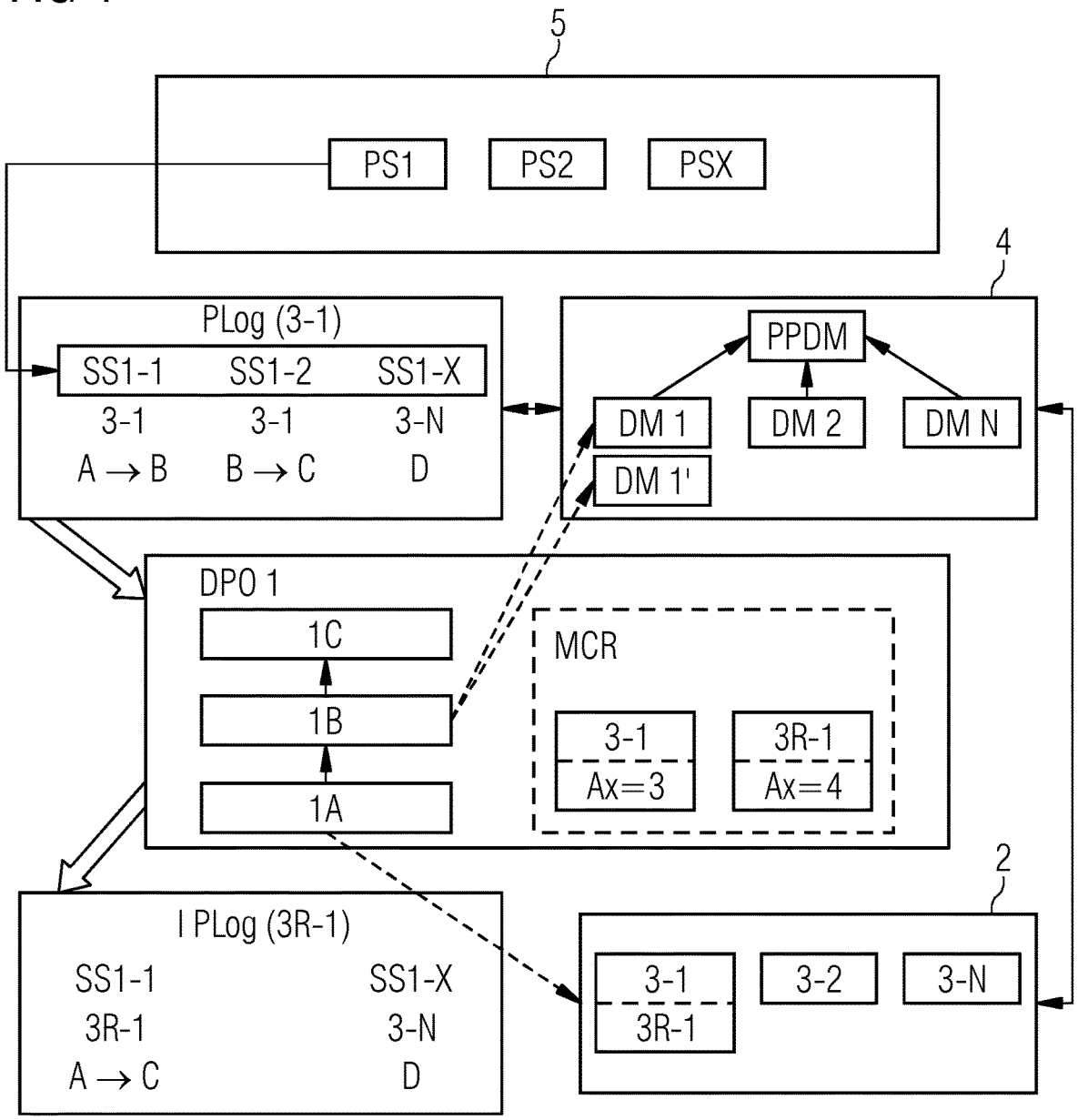

affected by the configuration changes detected by the watchdog component; and a process resequencer component adapted to perform a dynamic process optimization of the at least one production process of the production plant depending on the deviating model elements identified by the model comparator component.

14 Claims, 2 Drawing Sheets

(51) Int. Cl.
  *G06Q 50/04* (2012.01)
  *G06Q 10/06* (2012.01)
(52) U.S. Cl.
  CPC ....... *G06Q 10/06316* (2013.01); *G06Q 50/04* (2013.01); *G05B 2219/31449* (2013.01)
(58) Field of Classification Search
  USPC .............................................. 705/7.11–7.42
  See application file for complete search history.

(56) References Cited

U.S. PATENT DOCUMENTS

| | | | | |
|---|---|---|---|---|
| 2006/0218107 | A1* | 9/2006 | Young | G05B 13/027 706/13 |
| 2009/0204234 | A1* | 8/2009 | Sustaeta | G05B 13/0265 700/29 |
| 2014/0337277 | A1* | 11/2014 | Asenjo | G06F 16/283 707/603 |
| 2016/0333854 | A1 | 11/2016 | Lund et al. | |
| 2018/0129941 | A1* | 5/2018 | Gustafson | G06N 20/00 |
| 2018/0259921 | A1* | 9/2018 | Luan | G06N 20/00 |
| 2018/0322699 | A1* | 11/2018 | Gray | G06T 19/003 |
| 2018/0357334 | A1* | 12/2018 | Chao | G06F 16/907 |
| 2019/0066377 | A1* | 2/2019 | Schoening | G06T 19/003 |
| 2019/0121334 | A1* | 4/2019 | Song | G06N 20/00 |
| 2019/0122416 | A1* | 4/2019 | Otta | G06T 15/04 |
| 2019/0173109 | A1* | 6/2019 | Wang | H01M 8/04089 |
| 2019/0339687 | A1* | 11/2019 | Cella | H04L 67/12 |

OTHER PUBLICATIONS

Um Jumyung et al: "Plug-and-Simulate within Modular Assembly Line enabled by Digital Twins and the use of AutomationML", IFAC-Papersonline, vol. 50, No. 1, pp. 15904-15909, XP055489185, ISSN: 2405-8963, DOI: 10.1016/j.ifacol.2017.08.2360, the whole document; 2017.

Elmaraghy Hoda A: "Flexible and reconfigurable manufacturing systems paradigms", International Journal of Flexible Manufacturing Systems, Kluwer Academic Publishers, BO, vol. 17, No. 4, pp. 261-276, XP019434489, I SSN: 1572-9370, the whole document; 2006.

PCT International Search Report and Written Opinion of International Searching Authority dated Mar. 14, 2019 corresponding to PCT International Application No. PCT/EP2019/050761 filed Jan. 14, 2019.

Extended European Search Report dated Jul. 10, 2018 for Application No. 18152503.1.

* cited by examiner

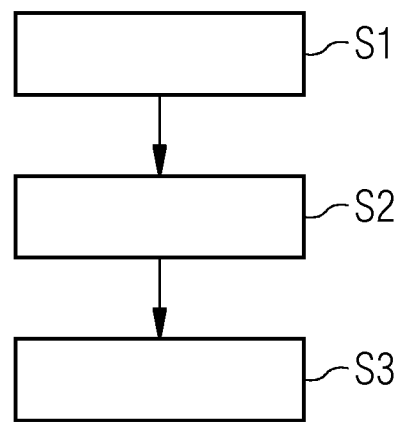

METHOD AND APPARATUS FOR OPTIMIZING DYNAMICALLY INDUSTRIAL PRODUCTION PROCESSES

CROSS-REFERENCE TO RELATED APPLICATIONS

This application claims priority to PCT Application No. PCT/EP2019/050761, having a filing date of Jan. 14, 2019, which is based on EP Application No. 18152503.1, having a filing date of Jan. 19, 2018, the entire contents both of which are hereby incorporated by reference.

FIELD OF TECHNOLOGY

The following relates to a method and apparatus for optimizing dynamically an industrial production process of a production plant consisting of a plurality of physical production modules.

BACKGROUND

A production plant which can produce a wide variety of different products can comprise a plurality of physical production modules, in particular manufacturing machines and/or transport facilities to transport workpieces during the production process. The industrial production process comprises sequences of production process steps. The production modules of the production plant can be subject to changes such as upgrades, production line changes, product changes and/or changes due to repair and/or maintenance. Whenever a physical production module is altered or exchanged, an associated digital twin data model can be changed accordingly. This data model change of a digital twin data model of the physical module can be either performed manually or automatically. For instance, an engineer can update the digital twin data model of a physical module which has been upgraded. However, the change of a production module can lead to unwanted, wrong or sub-optimal process sequences of the production process. Critical production module changes such as a replacement of a whole production module can require a complete process recalculation by an ERP system or even manually by human operators.

In a conventional industrial production plant, when it comes to critical production module changes production lines or process segments must first be shutdown, before the respective physical production modules of the production plant can be altered or replaced. Further, the respective software components, i.e. the data models of the production modules must be changed. Finally, the production line process segment can be restarted and tested together with the respective changed or updated software components. This conventional approach is very time-consuming and involves extensive manual activities both for physical installations and/or software-related changes.

SUMMARY

An aspect relates to a method and apparatus for optimizing dynamically an industrial production process wherein required installation and adaptation times are significantly reduced.

Embodiments of the invention provides according to the first aspect a process optimizer apparatus for optimizing dynamically an industrial production process of a production plant including physical production modules, wherein the process optimizer comprises:
a watchdog component adapted to monitor the production modules of the production plant to detect configuration changes within the production plant,
a model comparator component adapted to evaluate a production plant data model of the production plant comprising digital twin data models related to physical production modules of the production plant to identify automatically deviating model elements of digital twin data models related to physical production modules of the production plant affected by the configuration changes detected by the watchdog component and
a process resequencer component adapted to perform a dynamic process optimization of at least one production process of the production plant depending on the deviating model elements identified by the model comparator component.

In a possible embodiment of the process optimizer apparatus according to the first aspect of embodiments of the present invention, the watchdog component of the process optimizer apparatus is connected to a communication infrastructure of the production plant to detect configuration changes within the production plant comprising hardware configuration changes and/or software configuration changes related to physical production modules of the production plant.

In a further possible embodiment of the process optimizer apparatus according to the first aspect of embodiments of the present invention, the watchdog component is fed with plant data of the production plant via a data interface.

In a still further possible embodiment of the process optimizer apparatus according to the first aspect of embodiments of the present invention, the production plant data model comprises digital twin data models of the physical production modules of the production plant stored in a local memory of the process optimizer apparatus or stored in a remote database connected to the process optimizer apparatus.

In a still further possible embodiment of the process optimizer apparatus according to the first aspect of embodiments of the present invention, the production plant data model comprises as twin data models for the physical production modules of the production plant attribute-value lists indicating capabilities of the respective production modules.

In a further possible embodiment of the process optimizer apparatus according to the first aspect of embodiments of the present invention, the model comparator component is implemented to perform rule-based attribute-to-attribute comparisons in the attribute-value lists of the stored production plant data model for production modules affected by configuration changes detected by the watchdog component to identify automatically deviating model elements, in particular value changes in the attribute-value lists.

In a further possible embodiment of the process optimizer apparatus according to the first aspect of embodiments of the present invention, the production plant data model comprises a semantic data model representing an ontology comprising digital twin data models characterizing capabilities of the physical production modules and dependencies between the physical production modules of the production plant.

In a further possible embodiment of the process optimizer apparatus according to the first aspect of embodiments of the present invention, the process resequencer component is adapted to determine if the deviating model elements identified by the model comparator component have effects and/or implications on production process sequences of production process steps performed by production modules of the production plant and is adapted to provide, if an effect has been identified, a dynamic resequencing of production process sequences performed by production modules of the production plant based on a predefined set of relations specifying dependencies between physical production modules and production process steps of the production process.

In a possible embodiment of the process optimizer apparatus according to the first aspect of embodiments of the present invention, the production process steps of the production process sequences are stored in an ERP database.

In a still further possible embodiment of the process optimizer apparatus according to the first aspect of embodiments of the present invention, the process optimizer apparatus is adapted to perform the automatic optimization of the industrial production process of the production plant during runtime of the production plant on the basis of real-time data received by the watchdog component of the process optimizer apparatus monitoring the production modules of the production plant.

In a still further possible embodiment of the process optimizer apparatus according to the first aspect of embodiments of the present invention, the process optimizer apparatus is adapted to perform the automatic optimization of the industrial production process of the production plant during a simulation session where an industrial production process of the production plant is simulated.

In a still further possible embodiment of the process optimizer apparatus according to the first aspect of embodiments of the present invention, the production modules of the production plant comprise transport production modules adapted to transport workpieces and/or intermediate products between predefined positions to perform associated production process steps, wherein the transport production modules comprise in particular robot arms and/or conveyor belts.

In a still further possible embodiment of the process optimizer apparatus according to the first aspect of embodiments of the present invention, the digital twin data model of a physical production module is updated automatically when the corresponding physical production module is upgraded.

In a still further possible embodiment of the process optimizer apparatus according to the first aspect of embodiments of the present invention, the process optimizer apparatus is implemented on a local server of the production plant.

In a still further possible alternative embodiment of the process optimizer apparatus according to the first aspect of embodiments of the present invention, the process optimizer apparatus is implemented on a remote server connected to the communication infrastructure of the production plant.

Embodiments of the invention further provides according to a further aspect a production plant comprising the features of claim 14.

Embodiments of the invention provides according to the second aspect a production plant comprising a plurality of production modules adapted to perform production process steps of a production process and comprising a process optimizer apparatus according to the first aspect of embodiments of the present invention.

Embodiments of the invention further provides according to a third aspect a method for optimizing dynamically an industrial production process of a production plant including physical production modules, the method comprising the steps of:

monitoring the production modules of the production plant to detect configuration changes within the production plant, evaluating a production plant data model of the production plant comprising digital twin data models related to physical production modules of the production plant to identify automatically deviating model elements of digital twin data models related to physical production modules of the production plant affected by the detected configuration changes, performing a dynamic process optimization of at least one production process of the production plant depending on the identified deviating model elements.

BRIEF DESCRIPTION

Some of the embodiments will be described in detail, with reference to the following figures, wherein like designations denote like members, wherein:

FIG. 1 shows a schematic diagram of a system comprising a process optimizer apparatus according to the first aspect of the present invention; and FIG. 2 shows a flowchart of a possible exemplary embodiment of a method for optimizing automatically an industrial production process according to the second aspect of the present invention.

DETAILED DESCRIPTION

In the schematic diagram of FIG. 1, a dynamic process optimizer (DPO) apparatus 1 according to the first aspect of the present invention is provided for optimizing dynamically an industrial production process of a production or manufacturing plant including different physical production modules. The production plant 2 can comprise a plurality of different and complex physical production modules 3-$i$ to perform process steps. Physical production modules 3-$i$ can comprise machines performing process steps on work pieces and/or intermediate products during the production process. The production modules 3-$i$ can also comprise physical transport production modules adapted to transport workpieces and/or intermediate products between predefined positions to perform associated production process steps. These transport production modules can comprise for instance robot arms of robot units and/or conveyor belts. In the illustrated example of FIG. 1, the production plant 2 comprises a shop floor with different physical production modules 3-1, 3-2 . . . 3-N as illustrated in FIG. 1. The physical production modules can be connected to each other in series and/or in parallel to provide a network of production modules which are adapted to perform production process sequences consisting of one or more process steps. The number of production modules 3-$i$ implemented in the shop floor of the production plant 2 can vary depending on the complexity of the industrial production process. In a possible embodiment, the dynamic process optimizer apparatus 1 comprises an interface and is connected to the communication infrastructure of the production plant 2. The communication infrastructure of the production plant 2 can comprise a local area network LAN to which the different physical production modules 3-$i$, in particular machines and/or transport elements are connected. The connection to the communication infrastructure can comprise a wireless and/or a wired connection. In a possible embodiment, the process optimizer apparatus 1 comprises three main components as also illustrated in FIG. 1.

In the illustrated embodiment, the dynamic process optimizer (DPO) apparatus 1 comprises a watchdog component 1A, a model comparator component 1B and a process resequencer component 1C. The watchdog component 1A of the process optimizer apparatus 1 is adapted to monitor the production modules 3-$i$ of the production plant 2 to detect configuration changes within the monitored production plant 2. The model comparator component 1B of the process optimizer apparatus 1 is configured or adapted to evaluate a production plant data model or a twin data model of the production plant 2 which comprises digital twin data models related to physical production modules 3-$i$ of the production plant 2 to identify automatically deviating model elements of digital twin data models related to physical production modules of the production plant 2 affected by the configuration changes detected by the watchdog component 1A. The production plant data model PPDM (digital twins) can be stored in a local memory and/or a remote database 4 as illustrated in FIG. 1. The production plant data model PPDM comprises a number of digital twin data models DMs related to corresponding physical production modules 3-$i$ of the production plant 2. In a possible embodiment, the production plant data model PPDM comprises as twin data models DMs for the physical production modules 3-$i$ of the production plant 2 attribute-value lists indicating capabilities of the respective production modules 3-$i$. The capabilities of each production module 3-$i$ in the production plant 2 can be formulated in a possible embodiment in simple attribute-value lists. For instance, a production module 3-1 formed by a robot arm can comprise for the attribute number of axes the value NumberAxis Ax=3. In a possible embodiment, the model comparator component 1B can be implemented to perform a rule-based distributed to attribute comparisons in the attribute-value lists of the stored production plant data models for production modules 3-$i$ affected by configuration changes detected by the watchdog component 1A to identify automatically deviating model elements, in particular value changes in the attribute-value lists, as a model comparison result MCR. Direct attribute-to-attribute comparisons can be performed by the model comparator component 1B of the process optimizer apparatus 1 based on a rule-based system. For instance, if a robot arm as a physical production module 3-1 is exchanged by a replacing robot arm 3R-1 capabilities and/or characteristics of the physical production module 3-1 can be changed. For instance, the new robot arm replacing the previous robot arm may comprise a higher number of production axes. For instance, the previous production plant module 3-1 formed by a robot arm with only three axes (Ax=3) can for instance be replaced by a new robot arm forming a new replacing production module 3R-1 having four axes (Ax=4). In this example, the performed configuration change within the production plant 2 is a hardware configuration change where an existing production module 3-$i$ such as a robot arm is replaced by a replacement production module 3R-$i$. This hardware configuration change can be detected by the monitoring watchdog component 1A of the dynamic process optimizer apparatus 1. The watchdog component 1A is adapted to detect automatically configuration changes performed at the production plant 2, in particular hardware configuration changes when hardware components are changed (e.g. upgraded) or replaced. In a further possible embodiment, the watchdog component 1A of the dynamic process optimizer 1 can also be adapted to detect software configuration changes related to physical production modules 3-$i$ of the production plant 2. For instance, a local control software component can be reconfigured or updated causing a software configuration change observed by the watchdog component 1A of the dynamic process optimizer apparatus 1. The model comparator component 1B is adapted to automatically identify deviating model elements of digital twin data models DMs related to physical production modules 3-$i$ of the production plant 2 affected by the configuration changes detected by the watchdog component 1A. For instance, if a robot arm 3-1 having three axes (Ax=3) is replaced by a robot arm 3R-1 having four axes (Ax=4), an attribute in the corresponding attribute-value list forming a digital twin data model of the respective production module changes its stored value from the previous value 3 to the new value 4. In a possible embodiment, the digital twin data model of a physical production module is updated automatically when a corresponding physical production module 3-$i$ of the production plant 2 is upgraded or changed. In a possible embodiment, the memory or database 4 where the production plant data model is stored can comprise an interface with the communication infrastructure of the shop floor of the production plant 2. In this embodiment, the different digital twin data models DMs of the production modules 3-$i$ can be automatically updated, automatically when the corresponding physical production module 3-$i$ is upgraded physically.

The dynamic process optimizer (DPO) apparatus 1 further comprises a process resequencer component 1C which is adapted to perform a dynamic process optimization of at least one production process of the production plant 2 depending on the deviating model elements identified by the model comparator component 1B. In a possible embodiment, the process resequencer component 1C is configured to determine if the deviating model elements identified by the model comparator component 1B as a model comparison result MCR have effects and/or implications on production process sequences of production process steps performed by production modules 3-$i$ of the production plant 2. If an effect or implication has been identified by the process resequencer component 1C, a dynamic resequencing of production process sequences performed by the production modules of the production plant 2 can be performed by the process resequencer component 1C based on a predefined set of relations which specify dependencies between physical production modules 3-$i$ and product process steps of the production process. In a possible embodiment, the production process steps of the production process sequences are stored in an ERP database 5 as illustrated in FIG. 1. In the illustrated embodiment, the industrial process comprises a number X of process steps PS to be performed by the production plant 2. In a possible embodiment, the process resequencer component 1C can comprise a rule engine which works in two phases. In a first phase, the process resequencer component 1C finds out if the deviating model elements received from the model comparator component 1B do have an effect on the currently queued production/process steps. For instance, the first process step PS1 can consist of substeps SS1-1, SS1-2 and SS1-X as also illustrated in FIG. 1. In the production plant 2, substep SS1-1 can be performed by production module 3-1 which can comprise a robot arm that lifts a workpiece onto a conveyor belt 3-N along a trajectory or moving route. The model comparator component 1B can detect that production module 3-1 was exchanged by a replacement production module 3R-1 offering improved capabilities because of an additional axis. This improved capability can have as a consequence or effect that substep SS1-2 of the production process is no longer required. The detection of implications and/or effects due to model changes currently ongoing and/or future plant production sequences for specific products can be performed in the first phase by the process resequencer component 1C based on a predefined set of relations. Each relation can specify dependencies between a physical production module 3-*i* and production steps PS available in the production plant 2. For instance, if the first production module 3-1 is a robot arm having only three axes (Ax=3), a motion pattern could be that a workpiece is moved from a beginning position A to an intermediate position B and then from the intermediate position B to the final position C. From there, it is moved to D. The intermediate position B might be necessary because the robot arm has only three axes (Ax=3).

In contrast, after the robot arm has been replaced by the upgraded robot arm 3R-1 having four axes (Ax=4), the moving pattern can be that the workpiece is directly moved from the starting position A to the final position C. In this phase, the process substep SS1-2 becomes obsolete. The set of relations can be formulated based on a system's data model, e.g. a relational database, a semantic data model and/or a rule-based system. The execution of process replanning and/or resequencing in the second phase can be realized by invoking a default production planning mechanism of the specific production plant 2. The process resequencer component 1C of the dynamic process optimizer apparatus 1 can provide a dynamic process resequencing based on a predefined set of relations. In a possible embodiment, the replanned production steps can be re-entered in a plant's default production execution system.

As illustrated in FIG. 1, an initial process logic PLog of production module 3-1 is substituted by an improved process logic IPLog for the replaced production module 3R-1.

In a possible embodiment, the production plant data model PPDM comprises a semantic data model representing an ontology comprising digital twin data models DMs which characterize capabilities of the physical production modules and which characterize also dependencies between the different physical production modules 3-*i* of the production plant 2. In a possible embodiment, the production plant data model PPDM can comprise an OWL semantic data model. The semantic modelling allows to detect subtle and complex data dependencies. For instance, the capabilities of a new production module can be inferred to be similar with the capabilities of the previous replaced production module, although single attributes differ. This can be inferred due to possible replacements of one attribute for another. For example, for some production steps, it might for instance not matter if a robot arm offers four axes instead of three axes. It is possible that the stored ontology is traversed by a query language QL such as SPARQL.

In a possible embodiment, the dynamic process optimizer (DPO) apparatus 1 comprising the watchdog component 1A can receive sensor data from sensors placed in the production plant 2 to monitor different production modules 3-*i* of the production plant 2 and to receive real time or machine data from the production plant 2. In a possible embodiment, the dynamic process optimizer apparatus 1 is adapted to perform the automatic optimization of the industrial production process of the production plant 2 during runtime of the production plant 2 on the basis of the received real-time data. In an alternative embodiment, the dynamic process optimizer apparatus 1 can also be configured to perform the automatic optimization of the industrial production process in a simulation session where the industrial production process of the production plant 2 is simulated. In a possible implementation, the dynamic process optimizer apparatus 1 can operate in a real-time operation mode and/or in a simulation mode.

The process optimizer apparatus 1 can be implemented in a possible embodiment on a local server of the production plant 2. In an alternative embodiment, the process optimizer apparatus 1 is implemented on a remote server connected to the communication infrastructure of the production plant 2, for instance via a data network. The dynamic process optimizer apparatus 1 has access to the memory or database 4 where the production plant data model PPDM is stored and to a memory or database 5 including the ERP information of the industrial process. In a possible embodiment, the improved process logic IPLog calculated by the dynamic process optimizer apparatus 1 for one or more production modules can be rewritten into the ERP memory 5 for further use.

FIG. 2 shows a flowchart of a possible exemplary embodiment of a method for optimizing dynamically an industrial production process of a production plant 2.

In a first step S1, the production modules 3-*i* of the production plant 2 are monitored to detect a configuration change within the production plant 2. This monitoring step can for instance be performed by a watchdog component 1A of a process optimizer apparatus 1. The detected configuration changes can comprise hardware configuration changes and/or software configuration changes related to the physical production modules 3-*i* of the production plant 2.

In a further step S2, a memorized production plant data model of the production plant 2 comprising digital twin data models DMs related to physical production modules 3-*i* of the production plant 2 is evaluated to identify automatically deviating model elements of digital twin data models related to physical production modules 3-*i* of the production plant 2 affected by the configuration changes detected in step S1. The evaluation of the production plant data model PPDM in step S2 can for instance be performed by a model comparator component 1B of a process optimizer apparatus 1.

In a further step S3, a dynamic process optimization of at least one production process of the production plant 2 is performed depending on the deviating model elements identified in step S2. The dynamic process optimization can be performed in a possible embodiment by a process resequencer component 1C of a process optimizer apparatus 1. The method illustrated in FIG. 2 can be performed in real time during operation of the production plant 2 or in a simulation session during a planning phase of the industrial production plant 2. With the method and system 1 according to embodiments of the present invention, installation and adaption time of data models and/or software models relevant to a production plant creation can be greatly reduced. Further, upgrades of production modules 3-*i* within an existing production plant 2 are facilitated. Moreover, it is possible to avoid in many cases a shutdown of the production plant 2 when changing or replacing parts and/or physical production modules of the production plant 2.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A process optimizer apparatus for optimizing dynamically an industrial production process of a production plant including physical production modules, the process optimizer apparatus comprising:
   (a) a watchdog component configured to monitor the production modules of the production plant to detect configuration changes within the production plant, wherein the watchdog component is connected to a communication infrastructure of the production plant to detect configuration changes within the production plant comprising hardware configuration changes and/or software configuration changes related to physical production modules of the production plant;
   (b) a model comparator component configured to evaluate a production plant data model of the production plant comprising digital twin data models related to physical production modules of the production plant to identify automatically deviating model elements of digital twin data models related to physical production modules of the production plant affected by the configuration changes detected by the watchdog component; and
   (c) a process resequencer component configured to perform a dynamic process optimization of the at least one production process of the production plant depending on the deviating model elements identified by the model comparator component.

2. The process optimizer apparatus according to claim 1, wherein the watchdog component is fed with plant data of the production plant via a data interface.

3. The process optimizer apparatus according to claim 1, wherein the production plant data model comprises digital twin data models) of the physical production modules of the production plant stored in a local memory of the process optimizer apparatus or stored in a remote database connected to the process optimizer apparatus.

4. The process optimizer apparatus according to claim 1, wherein the production plant data model comprises as twin data models for the physical production modules of the production plant attribute-value lists indicating capabilities of the respective production modules.

5. The process optimizer apparatus according to claim 4, wherein the model comparator component is implemented to perform rule-based attribute-to-attribute comparisons in the attribute-value lists of the stored production plant data model for production modules affected by configuration changes detected by the watchdog component to identify automatically deviating model elements, in particular value changes in the attribute-value lists.

6. The process optimizer apparatus according to claim 1, wherein the production plant data model comprises a semantic data model representing an ontology comprising digital twin data models characterizing capabilities of the physical production modules and dependencies between the physical production modules of the production plant.

7. The process optimizer apparatus according to claim 1, wherein the process resequencer component is configured to determine if the deviating model elements identified by the model comparator component have effects or implications on production process sequences of production process steps performed by production modules of the production plant and is configured to provide if an effect has been identified a dynamic resequencing of production process sequences performed by production modules of the production plant based on a predefined set of relations specifying dependencies between physical production modules and production process steps of the production process.

8. The process optimizer apparatus according to claim 1, wherein the production process steps of the production process sequences are stored in an ERP database.

9. The process optimizer apparatus according to claim 1, wherein the process optimizer apparatus is configured to perform the automatic optimization of the industrial production process of the production plant during a runtime of the production plant on the basis of real-time data received by the watchdog component of the process optimizer apparatus monitoring production modules of the production plant and/or during a simulation session where an industrial production process of the production plant is simulated.

10. The process optimizer apparatus according to claim 1, wherein the production modules of the production plant comprise transport production modules configured to transport workpieces between predefined positions to perform associated production process steps.

11. The process optimizer apparatus according to claim 1, wherein the digital twin data model of a physical production module is updated automatically when the corresponding physical production module is upgraded.

12. The process optimizer apparatus according to claim 1, wherein the process optimizer apparatus is implemented on a local server of the production plant or on a remote server connected to the communication infrastructure of the production plant.

13. A production plant comprising:
   a plurality of production modules configured to perform production process steps of a production process and
   the process optimizer apparatus according to claim 1.

14. A method for optimizing dynamically an industrial production process of a production plant including physical production modules, the method comprising:
   (a) monitoring production modules, by a watchdog component, of the production plant to detect configuration changes within the production plant, wherein the watchdog component is connected to a communication infrastructure of the production plant to detect configuration changes within the production plant comprising hardware configuration changes and/or software configuration changes related to physical production modules of the production plant;
   (b) evaluating a production plant data model of the production plant comprising digital twin data models related to physical production modules of the production plant to identify automatically deviating model elements of digital twin data models related to physical production modules of the production plant affected by detected configuration changes; and
   (c) performing a dynamic process optimization of at least one production process of the production plant depending on the identified deviating model elements.

* * * * *